Figure 1:
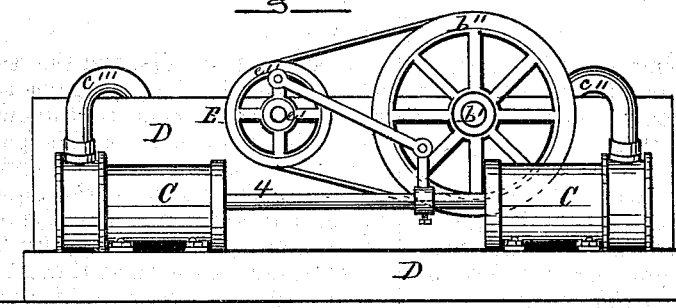

T. T. WOODRUFF.

Improvement in Process and Apparatus for the Manufacture of Indigo.

No. 126,663.  Patented May 14, 1872.

WITNESSES:  
Benj. Morison  
Wm. H. Morison

INVENTOR:  
Theodore T. Woodruff

UNITED STATES PATENT OFFICE.

THEODORE T. WOODRUFF, OF PHILADELPHIA, PENNSYLVANIA, ASSIGNOR OF ONE-HALF HIS RIGHT TO EDWARD S. MORRIS, OF SAME PLACE.

IMPROVEMENT IN PROCESSES AND APPARATUS FOR THE MANUFACTURE OF INDIGO.

Specification forming part of Letters Patent No. 126,663, dated May 14, 1872.

DIVISION A.

Specification describing certain Improvement in the process of oxidizing the freshly-fermented aqueous extract of the indigo plant and in the apparatus therefor, invented by THEODORE T. WOODRUFF, of the city of Philadelphia, in the State of Pennsylvania.

Hitherto, in the manufacture of indigo directly from the plant, it has been the most common and reliable practice in India and other countries most favorable to the growth of the plant, to effect the necessary oxidation of the aqueous extract run from the fermenting-vats, by compelling ten, more or less, of the native men or women to enter the receiving-tank and keep the fluid in agitation by beating it with oars, paddles, or shovels, for the three-fold purpose of liberating the carbonic-acid gas, exposing every particle of the liquid to the atmosphere, and agglomerating the oxidized indigo into flakes or granulations for precipitation, &c.

Although the above-described rude mode of producing the indigo is successful, it will be readily seen that it not only subjects the operators to severe and protracted labor, and exposure to the noxious effects of breathing the escaping carbonic-acid gas, but that the oxidation must be slow, irregular, and incomplete as to the whole of the extract, and consequently the result imperfect and wasteful.

The first part of my invention relates to the process of oxidizing by keeping the whole of the aqueous extract in agitated and rapid circulation in mingled contact with atmospheric air driven in different directions through the same, in such a manner that every part of the said liquid will be simultaneously exposed to the oxidizing action of the air; the object of this part of my invention being to cause the oxidation of all the extract contained in the fluid, as nearly as possible at the same time, and in a more rapid and perfect manner, and the subsequent granulation and precipitation of the indigo in a more perfectly oxidized and uniformly good condition.

The second part of my invention relates to the combination of air-forcing pumps and delivery-tubes, and a current-driving paddle-wheel, with an oblong tank having circular ends, and a longitudinal partition in its middle of such a length as will leave an open way between its two ends, and the respective ends of the tank, for the passage of the contained fluid through the same continuously around in the tank; the object of this part of my invention being to produce a simultaneous exposure of every part of the aqueous extract in the tank to the action of the oxygen of the atmosphere, and thus expedite the oxidizing process, and at the same time liberate the carbonic-acid gas without subjecting the operators to its noxious influence.

Figure 2:
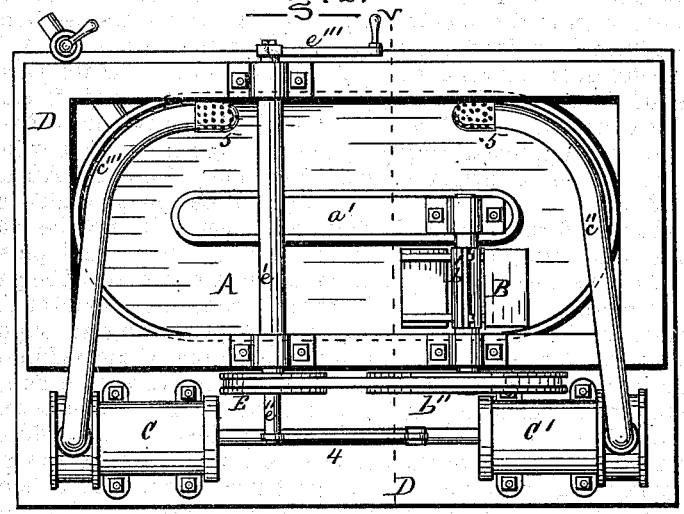
Figure 3:
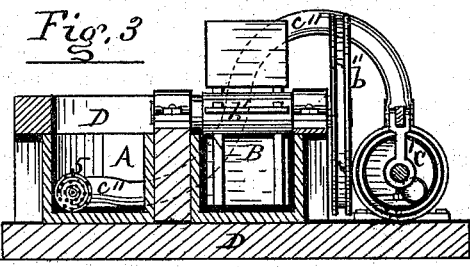

Figure 1 is a side elevation of the apparatus. Fig. 2 is a plan view of the same. Fig. 3 is a vertical transverse section on the right-hand side of the dotted line V V of Fig. 2.

A is the tank, and $a'$ its partition. B, the paddle-wheel; C C', the air-forcing pumps; and $c''$ $c'''$, their respective delivery-tubes; and D D, the walls or iron frame which firmly support the whole. The tank A is intended to be, say, twenty feet long, eight feet wide, and three feet deep. It may be made of iron, of bricks laid in cement and plastered, or any other suitable material. The partition $a'$ may be of the same material and of the same depth, and sufficiently strong to support the inner end of the shaft $b'$ of the paddle-wheel B, while the opposite end thereof is supported by the exterior side wall—both ends turning in suitable bearing-blocks. The paddles of the wheel B are nearly as wide as the space between the partition $a'$ and that side of the tank A, and of such lengths as will allow them to pass freely over the bottom of the same. The wheel is driven by means of a large grooved wheel, $b''$, on the outer end of its shaft $b'$, and a belt which connects it to a smaller grooved wheel, E, on another shaft, $e'$, which is intended to be rotated by means of a crank-handle, $e'''$, or otherwise, so as to give motion to the wheel B. The pistons of the two air-pumps C C' are fixed on the opposite ends of the same piston-rod 4, which is connected to a wrist-pin, $e''$, on the small grooved wheel E, in such a manner that the rotary motion of the shaft $e'$ will move the piston-rod 4, so as to operate the air-pumps C C' alternately, and thus drive atmospheric air alternately through the respective delivery-tubes $c''$ $c'''$ within the tank A. The discharging end of each of the tubes $e''$ $e'''$ is fitted with a cylindrical spreader, 5, perforated with numerous side and end holes, and both spreaders are caused to rest on the bottom of the tank A when in operation.

In the operation of this apparatus, the fermented extract is to be run directly from the vats into the tanks A, and motion then given to the wheel B, so as to drive the fluid in a rapid continuous current around in the space between the partition and the sides and ends of the tank, while at the same time there will be alternately driven atmospheric air into the fluid through the tubes $c''$ $c'''$, by the action of the air-pumps C C', and thus there will be produced and continued a thorough intermingling of the fresh atmospheric air with the liquid until the oxidation of the extract is completed. The tubes $c''$ $c'''$, are then to be withdrawn, and the indigo allowed to precipitate to the bottom, and, the supernatant water having become clear, is to be drained off by a syphon, the precipitated indigo swept or pushed up to one end of the tank, and finally lifted out and transferred to the draining and drying pans— see specification, division B.

I claim as my invention—

1. The process of oxidizing the freshly-fermented aqueous extract of the indigo-plant by currents of fresh atmospheric air forcibly driven by air-pumps or otherwise in various directions through every part of the same, substantially as and for the purpose hereinbefore set forth.

2. The combination of the air-forcing pumps C C', the delivery-tubes $c''$ $c'''$, and the paddle-wheel B, or its equivalent, in combination with the tank A, divided by a partition, and arranged to operate together, substantially as and for the purpose hereinbefore set forth.

THEODORE T. WOODRUFF.

Witnesses:
BENJ. MORISON,
WM. H. MORISON.